July 4, 1950 L. RIEBMAN 2,513,428

SUPERREGENERATOR

Filed Oct. 20, 1947

INVENTOR.
LEON RIEBMAN
BY Allen V. Hazeltine
AGENT

Patented July 4, 1950

2,513,428

UNITED STATES PATENT OFFICE 2,513,428

SUPERREGENERATOR

Leon Riebman, Philadelphia, Pa., assignor to Philco Corporation, Philadelphia, Pa., a corporation of Pennsylvania Application October 20, 1947, Serial No. 780,928

8 Claims. (Cl. 250—20)

Figure 1:
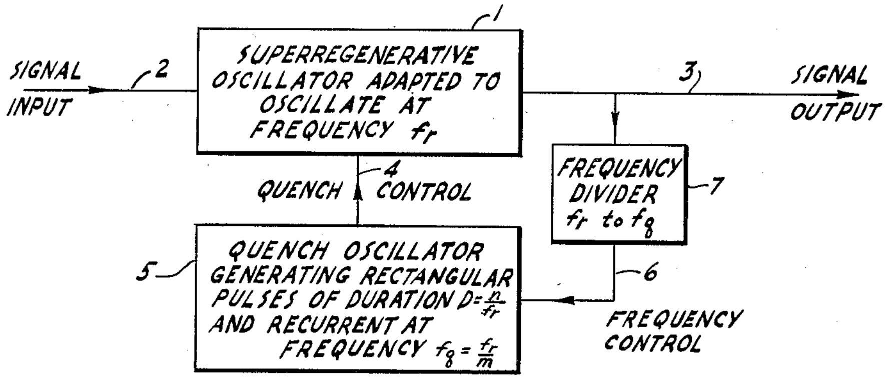

The invention herein described and claimed relates to improvements in superregenerative oscillators such as are adapted to be used, for example, in the reception and amplification of electrical wave signals.

For the purposes of this specification, a superregenerative oscillator may be regarded as consisting of an oscillatory circuit adapted to oscillate at a relatively high frequency, said oscillator being normally quenched or controlled in a manner to inhibit the build-up of oscillations therein, and adapted to be controlled or unquenched intermittently in a manner to permit oscillations to build-up therein, and said oscillator being adapted to be supplied with an input signal of relatively lower frequency, said input signal being adapted to control and determine the nature (e. g. the rate) of build-up of oscillations in said circuit, and said oscillatory circuit being provided with means for deriving an amplified output signal which varies in accordance with the variations in the oscillations in said oscillatory circuit and therefore in accordance with the variations in a predetermined characteristic of said input signal.

In superregenerative oscillatory circuits of the sort just defined, it is customary to select the frequency of unquenching so that it lies somewhere between the highest intelligence frequency component contained in the input signal and the frequency of oscillation of the superregenerative oscillator circuit. The frequency of unquenching must not be made too low or it will tend to produce a component of that frequency in the output signal derived from the oscillator and, when the latter signal is detected, as is customary, to yield an amplified version of the original intelligence signal, a component of this frequency will be present in the detected signal, which will usually prove to be objectionable. On the other hand, the frequency of unquenching must not be made too high; otherwise there will be an increased tendency to shock-excite the resonant tank circuit normally included in the superregenerative oscillator and thereby produce spurious and undesirable frequency components in the output of the superregenerative oscillator. In general, this tendency toward shock excitation will become greater as the frequency of unquenching approaches the frequency of oscillation. It will be noted that these factors will have a tendency to restrict the range of choice in the selection of the unquenching frequency. This may prove to be of considerable disadvantage, inasmuch as it has been found possible, by increasing the unquenching frequency, to increase the selectivity and amplifying capability of the superregenerative oscillator when used as a receiver of radiated high frequency signals. This may be desirable in numerous applications.

It is the primary object of this invention to provide methods of and means for avoiding this apparent limitation with regard to the selection of the unquenching frequency in a superregenerative oscillator circuit, and thereby to make possible the achievement of better selectivity, higher amplification and other advantages which will become apparent hereinafter.

According to the invention this limitation is avoided and at the same time the tendency toward shock excitation of the superregenerative oscillator circuit is avoided, even though, in accordance with the invention, the frequency of unquenching may lie much closer to the frequency of oscillation of the superregenerative circuits than in conventional superregenerative oscillators according to the prior art.

These objectives are achieved, according to the invention, by judicious selection of the durations of the intervals during which the oscillator is unquenched and also, preferably, but not necessarily, by judicious selection of the value of the frequency of unquenching with reference to the frequency of oscillation of the superregenerator. More specifically, for reasons which will become apparent hereinafter, the durations of the unquenched intervals are made substantially equal to an integer divided by the predetermined frequency of oscillation in the superregenerator. Also, preferably but not necessarily, the frequency of unquenching is made equal to a subharmonic of the frequency of oscillation in the superregenerator.

Figures 2, 3:
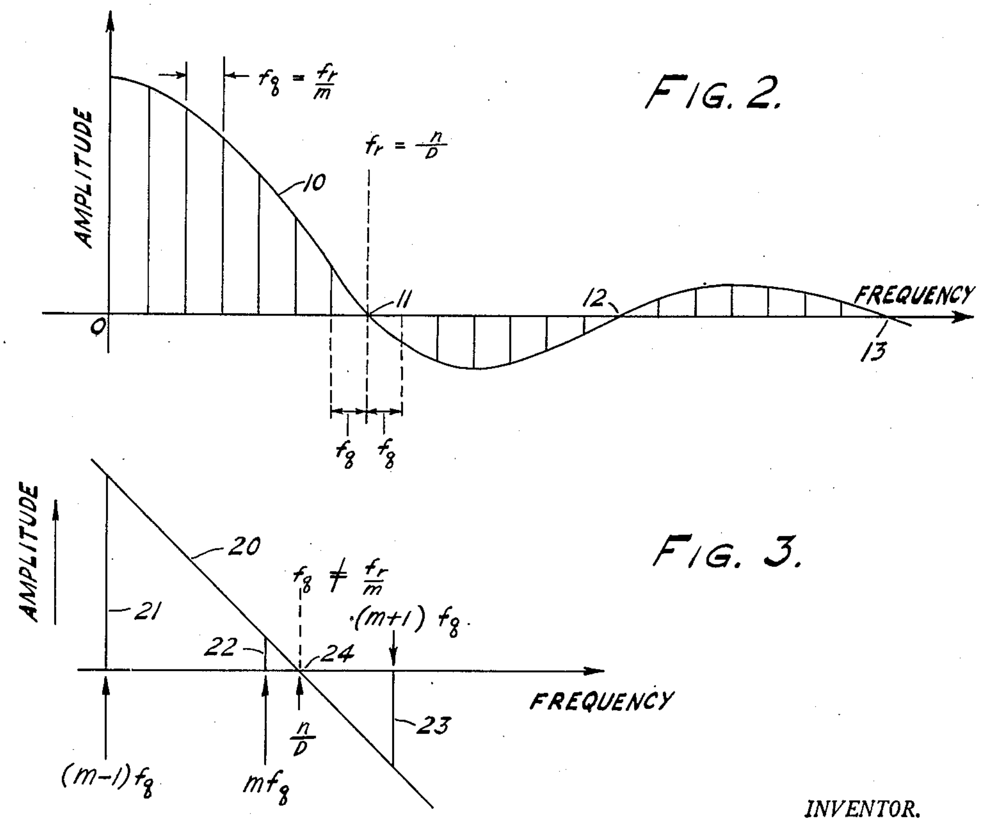

The reasons for selecting the durations and frequency of the unquench intervals in accordance with these criteria, as well as other features and advantages of the invention, will become apparent from a consideration of the following detailed description of a representative embodiment of the invention and by reference to the drawings in which: Fig. 1 is a block diagram of a superregenerative oscillator system according to the invention, and Figs. 2 and 3 are explanatory diagrams to which reference will be made in explaining the method and principle of the invention and the manner in which the durations and frequency of the unquench intervals are selected.

For convenience in description and in explaining the principles of the invention, the invention will be described with reference to a superregenerative oscillator arrangement employing a separate quench signal source or generator. It is to be understood however that the invention is likewise applicable to superregenerators of the self-quenched type in which the quench oscillator forms a part of the superregenerator itself and may utilize certain components in common therewith, as for example, in the form of oscillator shown and described in co-pending application Serial No. 662,418 of Joseph C. Tellier, filed April 16, 1946 and relating to a Superregenerative Oscillator.

Referring now to Fig. 1 there is shown a superregenerative oscillator 1 which is normally quenched so that no oscillations exist therein; but which is adapted to be unquenched during certain intervals in response to a quench control signal supplied to it through connection 4 from a quench oscillator 5 so that, during these certain unquenched intervals, oscillations will tend to build up in superregenerative oscillator 1 at a predetermined frequency $f_r$ determined by the values of the parameters of circuits comprising the superregenerative oscillator. Superregenerative oscillator 1 is adapted to be supplied through connection 2 with an input signal which will be effective to control the nature of the build-up of oscillations in the superregenerative oscillator during its unquenched intervals. More specifically, in the usual form of superregenerative oscillator, the value of this input signal, at the commencement of a particular unquenched interval, will determine the rate at which oscillations will build up in the superregenerative oscillator during the unquenched interval. When, for example, the superregenerator is utilized in a radio or like receiver, the input signal supplied through connection 2 may be a modulated radio frequency carrier wave signal intercepted by the receiving antenna, which, in certain instances, may be amplified before being supplied to the superregenerative oscillator. There is also provided a connection 3 for deriving output signal from the superregenerative oscillator 1, which signal will comprise oscillations at the superregenerative oscillator frequency $f_r$, which vary in amplitude in response to the variations in the modulation envelope of the input signal supplied through connection 2.

The detailed circuits comprising superregenerative oscillator 1 have not been illustrated since the invention is broadly applicable to superregenerators generally, of which there are a multitude of forms—all operating on the same basic principle. From the following discussion it will be apparent to anyone skilled in the art, to which this invention appertains, how to proceed in applying the principles of the invention to any form of superregenerator.

Quench oscillator 5 likewise may be any well known form of oscillator adapted to generate periodically recurrent pulse signals. In accordance with the invention it is adjusted to generate periodically recurrent pulses, preferably of substantially rectangular wave form, and of duration D equal to $$\frac{n}{f_r}$$

where $n$ is a positive integer—that is, pulses of duration equal to an integer divided by $f_r$. The reasons for utilizing pulses of duration thus related to the frequency of oscillation of superregenerative oscillator 1 will presently become apparent. The polarity of these pulses should be such that, when applied through connection 4 to superregenerative oscillator 1 in a predetermined manner, they will effect unquenching of the superregenerative oscillator during intervals coextensive with their occurrence.

Preferably also, according to the invention, the recurrence frequency $f_q$ of the pulses generated by quench oscillator 5 is controlled so as to be substantially equal to $$\frac{f_r}{m}$$

where $m$ is a positive integer which may differ from the value of $n$—that is the recurrence frequency $f_q$ is made substantially equal to a subharmonic of the frequency $f_r$ of superregenerative oscillator 1. This control may be effected in response to the output from superregenerative oscillator 1 supplied through connection 6 to quench oscillator 5 to control its frequency in any of the well known ways customarily employed to effect such control. To this end, connection 6 may include a frequency divider 7 adapted to divide the frequency of the output from superregenerative oscillator 1 by the integer $m$, thereby to yield a frequency equal to $f_q$ the desired recurrence frequency of pulses generated by quench oscillator 5. Frequency divider 7 may be of any conventional form.

It is particularly to be noted that it is not essential, in practicing the invention, that the frequency of recurrence of pulses generated by quench oscillator 5 be controlled to a subharmonic of the superregenerative oscillator frequency $f_r$. However, for reasons which will be mentioned hereinafter, improved results will usually be obtained if this condition is maintained.

The considerations involved in the selection of the duration D of the unquenching pulses and the frequency $f_q$ of their recurrence will now be discussed with reference to Figs. 2 and 3. In general, the unquenching signal will comprise a spectrum consisting of a plurality of frequency components. If the unquenching pulses are of substantially rectangular waveform, this spectrum will consist of a plurality of discrete, harmonically related components. More specifically, if the recurrence frequency $f_q$ of the unquenching pulses is a sub-harmonic of the superregenerative oscillator frequency $f_r$, the relative amplitudes and spacings of the several components will be as indicated in the diagram of Fig. 2, where the positions of the equally spaced vertical lines indicate the locations of the components along the horizontally disposed frequency axis and their lengths indicate the relative magnitudes of the several components. The envelope 10 defining the amplitudes of the several components is specified by the expression $$A=\frac{\sin \pi f D}{\pi f D}$$

where $f$ is the frequency of an individual component and D is the unquenching pulse duration, as hereinbefore defined. It will be noted that this envelope crosses and recrosses the frequency axis at points 11, 12, 13 at which the values of $f$ in the above equation are equal to an integer $n$ divided by the duration D of the unquenching pulses.

From this graph it will be seen that the superregenerative oscillator frequency $f_r$ can be selected to lie intermediate between any two adjacent components of the quench signal spectrum, whereby the probability of shock-excitation of the superregenerative oscillator circuits by a harmonic of the fundamental quench frequency will be substantially reduced. This concept is disclosed in my copending application Serial No. 783,981, filed November 4, 1947, and directed to an Electrical System, which contains claims directed to this general method of operation and to the means for achieving it. In accordance with the present invention, however, it is proposed to select the frequency of the superregenerative oscillator so as to coincide substantially with one of the points at which the envelope 10 crosses the frequency axis. By so selecting the superregenerative oscillator frequency $f_r$, it will result that the adjacent components of the quench signal, lying respectively immediately above and below the superregenerative oscillator frequency $f_r$, will be spaced therefrom by the quench frequency $f_q$. In this special case, therefore, the spacing between the superregenerative oscillator frequency $f_r$ and the nearest harmonics of the fundamental quench frequency $f_q$ will be twice as great as in the case where the superregenerative oscillator frequency $f_r$ is disposed intermediate between two adjacent harmonically related frequency components in the spectrum of the quench control signal, and the probability that the superregenerative oscillator circuits will be shock-excited in response to these frequency components will be correspondingly reduced.

In arranging that the superregenerative oscillator frequency $f_r$ shall coincide with one of the crossover points 11, 12, 13, use is made of the fact that the positions of these crossover points are determined by the duration of the unquenching pulses. Specifically the crossover points occur at frequencies equal to a positive integer divided by D. Accordingly various possible values of the superregenerative oscillator frequency are given by the relation $$f_r=\frac{n}{D}$$

where $n$ is a positive integer. Thus, if the superregenerative oscillator frequency has already been specified, this relation may be used to determine various possible values of the unquenching pulse duration in accordance with the invention by substituting various integral values of $n$ in the relation. Likewise, if the duration D of the unquenching pulses is first specified, the relation may be utilized in a similar manner to determine the various values of the superregenerative oscillator frequency $f_r$ which are feasible according to the invention.

As hereinbefore mentioned, it is preferable that the fundamental frequency $f_q$ of the quench control signal be a sub-harmonic of the superregenerative oscillator frequency $f_r$. In other words, the equation $$f_q=\frac{f_r}{m}$$

where $m$ is an integer, should be satisfied. This results in a quench signal spectrum of the sort shown in Fig. 2, in which not only are the several components equally spaced along the frequency axis at intervals equal to $f_q$, but also the components immediately above and below each crossover point (11, 12, 13) are spaced from the crossover point by $f_q$. This, however, is not absolutely essential to the achievement of substantially improved operation in accordance with the invention. This will be apparent from a consideration of Fig. 3 in which is represented a relatively small section horizontally in the vicinity of a crossover point in a diagram similar to that of Fig. 2, but for the case in which the fundamental frequency $f_q$ of the quenching signal is not a sub-harmonic of the superregenerative oscillator frequency $f_r$ $$\left(\text{i. e., } f_q\neq\frac{f_r}{m}\right)$$

In this diagram are shown a portion of the envelope 20 defining the magnitudes of the quench frequency components, and lines 21, 22 and 23 representative of three of the quench frequency components corresponding to harmonics of the quench frequency $f_q$ whose frequencies are, respectively, $(m-1)\ f_q$, $mf_q$ and $(m+1)\ f_q$, where $m$ is a positive integer not necessarily equal to the integer $n$ determining the relationship between the superregenerative oscillator frequency $f_r$ and the unquenching pulse duration D.

As shown in the diagram of Fig. 3 the quench signal components 22 and 23 are unequally spaced with reference to the envelope crossover point 24 occurring at the frequency $$\frac{n}{D}$$

Thus it will be seen that, if the superregenerative oscillator frequency $f_r$ is located at the crossover point 24 in accordance with the invention, the tendency toward shock-excitation of the superregenerative oscillator circuits by harmonics of the fundamental quench frequency $f_q$ will be substantially reduced, since the adjacent harmonic components represented by lines 22 and 23 will both be substantially displaced from the crossover point 24, and the location of the superregenerative oscillator frequency at the crossover point insures against the occurrence of any quench signal component at that frequency. However, it will be apparent that because of the unequal spacing of the adjacent components 22 and 23, the maximum possible reduction in the probability of shock excitation of the superregenerator circuits will not be achieved as in the case discussed with reference to Fig. 2, where the superregenerative oscillator frequency is made equal to a harmonic of the fundamental quench frequency and also equal to an integer divided by the duration of the unquenching pulses. Nevertheless, there will be a substantial improvement over circuits of the prior art.

It is appropriate again to emphasize the desirability of utilizing a quench control signal of substantially rectangular waveform. The reason for this is that a signal having this waveform provides a frequency spectrum of discrete components which are equally spaced by the quench frequency. It will be apparent that the existence of such a spectrum permits the maximum displacement of the superregenerative oscillator frequency from adjacent components of the quench control signal and hence, the maximum reduction in the susceptibility of the superregenerative oscillator circuits to shock excitation by these components.

I claim:

1. In combination, a superregenerative oscillator having an input circuit and an output circuit and being adapted to oscillate at a predetermined frequency, said oscillator being normally quenched so as substantially to inhibit the build-up of oscillations therein and being adapted to be unquenched to permit oscillations to build up therein at said predetermined frequency and said oscillator being controllable in response to a signal supplied to its input circuit to determine the nature of build-up of oscillations therein, means for unquenching said oscillator substantially periodically during intervals of duration substantially equal to an integer divided by said predetermined frequency, and means for deriving from said output circuit a signal which is dependent upon the oscillations in said oscillator.

2. In combination, a superregenerative oscillator having an input circuit and an output circuit and being adapted to oscillate at a predetermined relatively high frequency, said oscillator being normally quenched so as substantially to inhibit the build-up of oscillations therein and being adapted to be unquenched to permit oscillations to build up therein at said predetermined frequency and said oscillator being controllable in response to an input signal comprising components of relatively lower frequency to determine the nature of build-up of oscillations therein, means for unquenching said oscillator substantially periodically during intervals of duration substantially equal to an integer divided by said predetermined frequency, and means for deriving from said output circuit a signal which is dependent upon the oscillations in said oscillator.

3. A combination according to claim 1 in which said unquenching means is adapted to unquench said oscillator periodically at a frequency which is a sub-harmonic of said predetermined frequency of oscillation of said oscillator.

4. A combination according to claim 3 including, in addition, means responsive to the frequency of oscillation of said superregenerative oscillator for controlling the frequency of unquenching by said unquenching means.

5. A combination according to claim 4 in which said additional means responsive to the frequency of oscillation of said superregenerative oscillator includes a frequency divider adapted to divide the frequency of the output signal from said superregenerative oscillator by an integer and to utilize the signal resulting from said division to determine the frequency of unquenching.

6. In combination, a superregenerative oscillator having an input circuit and an output circuit and being adapted to oscillate at a predetermined frequency, said oscillator being normally quenched so as substantially to inhibit the build-up of oscillations therein and being responsive to an unquenching signal supplied thereto to unquench said oscillator and to permit oscillations to build up therein at said predetermined frequency and said oscillator being controllable in response to a signal supplied to its input circuit to determine the nature of build-up of oscillations therein, a quench oscillator adapted to generate an unquenching signal comprising pulses recurring substantially periodically and of duration substantially equal to an integer divided by said predetermined frequency, means for supplying said unquenching signal generated by said quench oscillator to said superregenerative oscillator in a manner to unquench said superregenerative oscillator during intervals of duration substantially equal to the durations of said pulses comprising said unquenching signal, and means for deriving from said output circuit a signal which is dependent upon the oscillations in said superregenerative oscillator.

7. A combination according to claim 6 in which the pulses generated by said quench oscillator are of substantially rectangular waveform.

8. A combination according to claim 6 in which the pulses comprising said unquenching signal generated by said quench oscillator are recurrent at a frequency which is substantially a subharmonic of said predetermined frequency of oscillation of said superregenerative oscillator.

LEON RIEBMAN.

REFERENCES CITED

The following references are of record in the file of this patent:

UNITED STATES PATENTS

| Number | Name | Date |
|---|---|---|
| 1,971,347 | Hyland | Aug. 28, 1934 |
| 1,988,609 | Reeves | Jan. 22, 1935 |
| 2,039,657 | Osborne | May 5, 1936 |
| 2,076,168 | Turner | Apr. 6, 1937 |
| 2,153,202 | Nichols | Apr. 4, 1939 |
| 2,363,571 | Chaffee | Nov. 28, 1944 |
| 2,434,937 | Labin et al. | Jan. 27, 1948 |

OTHER REFERENCES

"Reference Data for Radio Engineers," Federal Telephone and Radio Corp. 1st ed., copyright 1943, pp. 160–170.

Frine, "Basic principles of super-regenerative reception," Proceedings IRE, January 1938, pages 76–106.